C. HYMERS.
Swivel Holder for Fish Hooks.
No. 236,161.                                Patented Jan. 4, 1881.
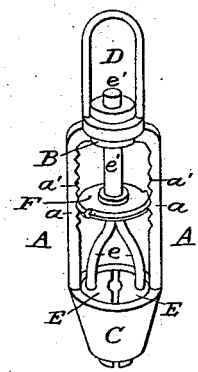
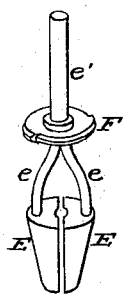
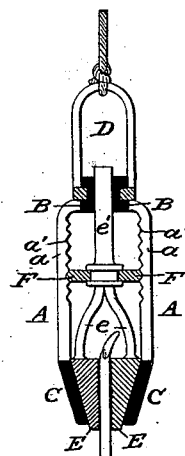
ATTEST:                          INVENTOR:

UNITED STATES PATENT OFFICE.

CHRISTOPHER HYMERS, OF ST. LOUIS, MISSOURI.

SWIVEL-HOLDER FOR FISH-HOOKS.

SPECIFICATION forming part of Letters Patent No. 236,161, dated January 4, 1881.

Application filed December 23, 1879.

*To all whom it may concern:*

Be it known that I, CHRISTOPHER HYMERS, of the city of St. Louis, in the State of Missouri, have invented certain new and useful Improvements in Swivel Clamps or Holders for Fish-Hooks; and I do hereby declare that the following is a full, clear, and exact description of the same, reference being had to the accompanying drawings, and to the letters of reference marked thereon.

The purpose of this invention is to form a cheap, durable, and effective holder or clamp for clamping and holding different sizes of fish-hooks, jewelry, wires, ropes and lines of hemp, wire, or other material; and this invention consists in the provision, in a suitably-formed head, of expanding jaws which, on being forced down, close together so as to hold any size of hook required. These jaws are held at any desired position by a turning cam journaled on the stem of the jaws and engaging in one of a series of notches in the side bars of the head, as will hereinafter more fully appear. The holder is provided with a swivel-loop at the end opposite to the holding-jaws, to prevent untwisting, kinking, &c., of the line or rope to which it is attached.

In the drawings, Figure 1 is a perspective view illustrating my invention. Fig. 2 is a vertical section. Fig. 3 is a detail perspective view of the expanding jaws and their attachments, and Fig. 4 is a detail plan of the locking-cam.

In the drawings, A represents the housing or head, having at top a cylindrical sleeve, B, and at bottom a conical sleeve, C, which are connected together by two side bars, a. To the sleeve B is connected the swivel-loop D, to which the line or rope is attached, as clearly indicated in the drawings.

Inside the housing A is arranged the holding or clamping device, consisting of expanding jaws E, having, preferably, spring-stems e e, connected together at top to a guide-stem, e'. The jaws E are formed tapering to fit the taper of the sleeve C, in order that the jaws will be forced together when they are pulled or pushed down into said sleeve. As the jaws E are drawn or pushed up they expand, so that various sizes of hooks, rods, &c., can be engaged between them and firmly and securely held.

The holding-surface of the jaws may be formed with a ratchet for the better holding of the article introduced between them.

In order to hold the jaws E in any position required there is arranged on the stem e' of said jaws a turning cam, F, which can be turned to engage any one of a series of notches, a', formed on the inner edges of the side bar, a, and thus hold the jaws in the required position.

Having thus fully described my invention, what I claim is—

1. The combination of the expanding jaws F, tapering sleeve C, side bars, a, provided with notches a', sleeve B, cam F, and spring-stems e e, as and for the purpose set forth.

2. The combination of the sleeve B, swivel
D, side bars, a, provided with notches a', sleeve C, expanding jaws E, and cam F, as and for the purpose set forth.

In testimony of said invention I have hereunto set my hand.

CHRISTOPHER HYMERS.

In presence of—
CHARLES BURDICK,
ROBT. BURNS.